United States Patent [19]

Gordon

[11] Patent Number: 4,882,687
[45] Date of Patent: Nov. 21, 1989

[54] PIXEL PROCESSOR

[75] Inventor: Dorothy A. Gordon, Cambridge, Mass.

[73] Assignee: Schlumberger Technology Corporation, Houston, Tex.

[21] Appl. No.: 846,657

[22] Filed: Mar. 31, 1986

[51] Int. Cl.[4] ........................ H03K 19/177; G06F 7/50
[52] U.S. Cl. ..................................... 364/518; 307/440; 307/445
[58] Field of Search ............... 364/518, 521, 711, 716; 358/26, 30, 33, 80, 141, 163, 165; 340/798–800; 307/440, 445

[56] References Cited

U.S. PATENT DOCUMENTS

| | | | |
|---|---|---|---|
| 4,190,892 | 2/1980 | Ebihara et al. | 364/711 |
| 4,484,187 | 11/1984 | Brown et al. | 340/703 |
| 4,520,358 | 5/1985 | Makino | 340/799 |
| 4,564,915 | 1/1986 | Evans et al. | 364/521 |
| 4,592,005 | 5/1986 | Kregness | 364/768 |
| 4,600,846 | 7/1986 | Burrows | 307/445 |
| 4,620,186 | 10/1986 | Krause et al. | 340/703 |
| 4,653,112 | 3/1987 | Ouimette | 382/69 |
| 4,667,305 | 5/1987 | Dill et al. | 364/900 |
| 4,672,357 | 6/1987 | Lorteije et al. | 340/793 |
| 4,675,811 | 6/1987 | Kishi et al. | 364/200 |
| 4,677,573 | 6/1987 | Brown et al. | 364/521 |
| 4,691,295 | 9/1987 | Erwin et al. | 364/900 |

OTHER PUBLICATIONS

Mano, *Digital Logic and Computer Design*, published 1979, pp. 26–27.
Applicon Fast Terminal Refresh Memory Specification July 31, 1979; 48 pages.
Memory Design for Raster Graphics Displays Mary C. Whitton; Mar. 1984; 18 pages.
The 8 by 8 Display: Robert F. Sproull and Ivan E. Sutherland, Jan. 1983; 25 pages.
Texas Instruments System Processor TMS34010 Advance; 1986.
Whittan et al. "Memory Design For Raster Graphics Displays" IEEE CG9A, Mar. 1984.

Primary Examiner—Emanuel S. Kemeny
Assistant Examiner—H. R. Herndon
Attorney, Agent, or Firm—Ladas & Parry

[57] ABSTRACT

Boolean AND or OR operations that are functions of two variables can be performed without knowledge of one of the variables. In a computer graphics system utilizing a frame-buffer memory to refresh a display, a pixel processor using this technique can perform SET and CLEAR functions on the data stored in the memory in which only memory write cycles are required.

16 Claims, 3 Drawing Sheets

PIXEL PROCESSOR

BACKGROUND OF THE INVENTION

This invention relates to a method and apparatus for the performance of Boolean AND and Boolean OR operations on functions of two variables in which only one variable need be known. In particular, it pertains to the manipulation of data stored in a multidimensional array of memory cells. This type of multidimensional array of memory cells is utilized in the frame buffer of a computerized display, such as may be found in a computer graphics system, where the Boolean operations are performed by the pixel processor of that system.

The typical display device for a computer system, the CRT, is a raster-scanned device which has no inherent memory. The image that is to appear each time the raster is scanned must be generated by an outside source. Where this image is to be maintained on the screen, such as in a computer graphics system, the information is typically stored in a digital memory. Semiconductor memories are now low enough in cost that raster-scanned frame-buffer memories are commonly used. In a frame-buffer memory, each location in the memory corresponds to one picture element on the screen, hereinafter referred to by its common technical term "pixel". This type of memory allows the display hardware to be insensitive to the image content, an arbitrary image can be displayed by properly recording the data at each location in the frame-buffer memory. Each time the raster on the CRT is scanned, the video signal to refresh the display is generated from the memory.

FIG. 1 is a simplified block diagram of a computer graphics display system utilizing a frame-buffer memory. Host computer 102 is coupled via bidirectional bus 104 to display processor 106. The display processor 106 is couled via bidirectional bus 108 to a memory system 110. Memory system 110 is coupled via bidirectional bus 112 to video generator 114 which is coupled via bus 116 to the display 118. In a system shown in FIG. 1, the frame-buffer, here shown as memory system 110, is not directly accessible to a host computer program. Instead, the frame-buffer memory is controlled by a display processor. This processor typically appears to the host as another input-output device. In a computer graphics system, the display processor can perform graphics functions such as writing lines or inserting text characters which are part of the graphics image into the frame-buffer memory for display on the CRT. The display processor would also include the necessary memory control and rasterizing functions in order to perform these operations.

The frame-buffer 110 includes a multidimensional memory array in which each location in memory corresponds to a pixel on the screen. If it is only necessary to store the presence or absence of illumination of that particular pixel, a two-dimensional memory array is sufficient. If, however, it is desired to control the intensity of the illumination and/or the color of the illumination of that particular pixel, then a three-dimensional memory is required. In the three-dimensional memory, each location stores a word which is used to store the information to control the intensity and/or color of the pixel.

Video generator 114 reads out memory 110 in order to provide the refreshed data to the display 118 over bus 116. The video generator also includes a digital-to-analog converter to convert the digital information stored in memory 110 into an analog signal which can be used by display 118. One common form of digital-to-analog converter utilized in this type of system utilizes a look-up table in which the information stored in the frame-buffer memory 110 is used to access the location in a table stored in a digital-to-analog converter which then generates the analog output. The use of a look-up table allows for linearizing of the signal because of the non-linear nature of the digital-to-analog converter. The substitution of one look-up table for another also allows changes in the shading of an image without the need to change the information stored in the frame-buffer memory 110. Video generator 114 would also typically contain a character generator for producing text on the screen. This text would not be part of the graphics image and therefore not subject to modifications made to the graphics image. It would be used to prompt the user of the system to perform some function, for example. The text would be inserted into the displayed image by a mask-mixer which is also typically a part of the video generator. The mask-mixer, in addition to "mixing" in the text, serves to mask those portions of the memory which are not to be displayed, as in the use of double-buffered displays. This technique would typically also involve the use of a post-mask register, which is described below.

The CRT display 118 includes all the necessary power supplies and scanning circuits, as are well known to those skilled in the art.

Modification of the data stored in the memory system 110 are typically performed by two techniques known to the prior art. In one technique, the information currently contained in the memory system for that pixel is read by the processor of the display processor 106 over bus 108. This information is then combined, by Boolean operations, with the new data by the arithmetic logic unit (ALU) of the display processor and then read back to the memory. This requires a read-modify-write cycle. This technique is somtimes known as a "software" technique because the ALU of the display processor 106 is programmed to perform the necessary Boolean operations. The requirement that the system perform a read-modify-write cycle, requires 2 microseconds per pixel in a typical system.

A much faster approach is shown by the memory system 200 shown in FIG. 2. This memory system includes an ALU 212 coupled to a memory array 220 via bus 216. The memory array 220 is the frame-buffer memory 110 shown in FIG. 1. The data from the memory is read out on bus 210 into data holding register 208 which then provides this information over bus 206 into an input to ALU 212. The new information to be placed in the memory is stored in a register 202, here shown as a color register because one of the typical inputs to be added to the data stored in memory is color information. The output of color register 202 is coupled via bus 204 into another input to ALU 212. The Boolean function to be performed is input to the ALU 212 over bus 214 from means not shown. This could be another register, for example. The ALU shown in this system is wired to perform the Boolean functions directly upon decoding the desired function from the information on bus 214. Thus, although the system also requires a read-modify-write cycle, this system can operate much faster than the system shown in FIG. 1, typically 700 nanoseconds per pixel. This hardware approach of adding an additional ALU to the system, thus produces an increase in speed of almost three to one.

Several factors have made an increase in the processing speed of the pixel information necessary. First of all, CRT displays are getting larger and the pixel density on the screen, that is the number of pixels per unit length, are increasing in order to provide greater resolution on the display. Both of these factors yield larger frame-buffer memories. In addition, it has become important to be able to provide faster changes to the information displayed on the screen, in order to perform such functions as animation. The combination of larger frame-buffer memories and faster presentation of images to the screen have made the speed of processing the information per pixel an important factor.

SUMMARY OF THE INVENTION

It is a general object of the present invention to provide an improved processor for performing Boolean AND and OR operations on functions of two variables and a method for operating same.

Another object of the invention is to provide a Boolean processor for AND and OR operations of two variables in which only one variable is known.

A further object of the invention is to provide a pixel processor for a computer graphics system in which only the information stored in the color register is known.

Yet another object of the present invention is to provide a pixel processor for a computer graphics system in which the information in the frame-buffer memory can be updated utilizing only a write cycle.

A still further aspect of the invention is to provide a pixel processor capable of modifying a plurality of pixels simultaneously.

Another object of the invention comprises a method of performing a Boolean OR operation on a function of two variagbles, one of said variables being stored in a first digital storage device which will also contain the result of said Boolean OR operation, and the other of said variables being stored in a second digital storage device. A digital "1" is written into said first digital storage device when the contents of said second digital storage device is a digital "1".

Yet another object of the invention comprises a method of performing a Boolean AND operation on a function of two variables, one of said variables being stored in a first digital storage device which will also contain the result of said Boolean AND operation, the other of said variables being stored in a second digital storage device. A digital "0" is written into said first digital storage device when the contents of said second digital storage device is a digital "0".

A further object of the invention includes apparatus for performing a Boolean AND operation on a function of two variables, one of said variables being stored in a first digital storage device which will also contain the result of said Boolean AND operation, the other of said variables being stored in a second digital storage device. The apparatus includes means for writing a digital "0" into said first digital storage device when the contents of said second digital storage device is a digital "0".

A still further object of the invention comprises apparatus for performing a Boolean OR operation on a function of two variables, one of said variables being stored in a first digital storage device which will also contain the result of said Boolean OR operation, the other of said variables being stored in a second digital storage device. This apparatus comprises means for writing a digital "1" into said first digital storage device when the contents of said second digital storage device is a digital "1".

Another aspect of the invention includes a computer graphics system includes having a computer means for generating data representative of images to be displayed. A frame-buffer memory means is coupled to said computer means for storing said data. A display is coupled to said memory means and refreshed by the data stored therein. A data register means stores information for modifying the data in said memory means. A pixel processor is coupled to said register means and to said memory means for modifying the data in said memory means by performing a Boolean OR operation with the data in said register means and said memory means. The pixel processor includes means for writing a digital "1" into said memory means when the contents of said register means is a digital "1".

Still another aspect of the invention includes a computer graphics system includes a computer means for generating data representative of images to be displayed. A frame-buffer memory means is coupled to said computer means for storing said data. A display is coupled to said memory means and refreshed by the data stored therein. A data register means stores information for modifying the data in said memory means. A pixel processor is coupled to said register means and to said memory means for modifying the data in said memory means by performing a Boolean AND operation with the data in said register means and said memory means. The pixel processor includes means for writing a digital "0" into said memory means when the contents of said register means is a digital "0".

Yet another aspect of the invention comprises a pixel processor for a computer grphics system having a display refreshed by a multidimensional memory array. The pixel processor modifies data in said memory array with data stored in a digital storage means. In performing a Boolean OR operation on the data stored in said memory array and data stored in said storage means the pixel process only performs a write cycle of said memory array.

A further aspect of the invention includes a computer graphics system having a display refreshed by a multidimensional memory array. The pixel processor modifies data in said memory array with data stored in a digital storage means. In performing a Boolean AND operation on the data stored in said memory array and data stored in said storage means the pixel process only performs a write cycle of said memory array.

DETAILED DESCRIPTION

Figure 1:
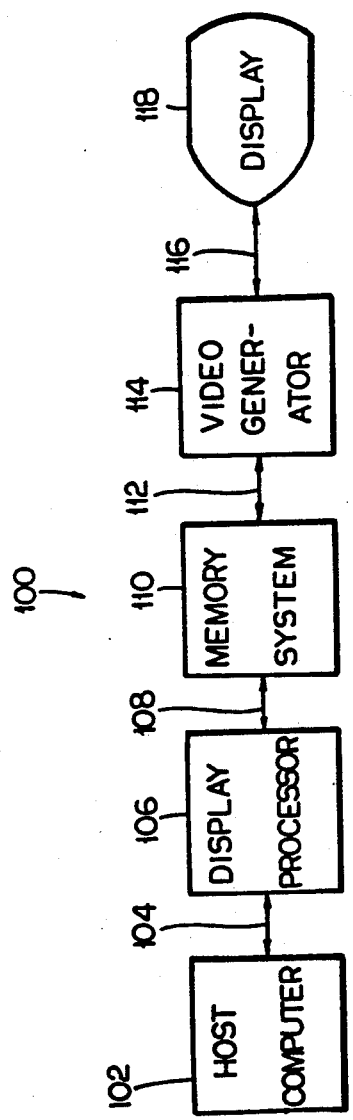
FIG. 1 is a simplified block diagram of a generalized computer graphics system.
Figure 3:
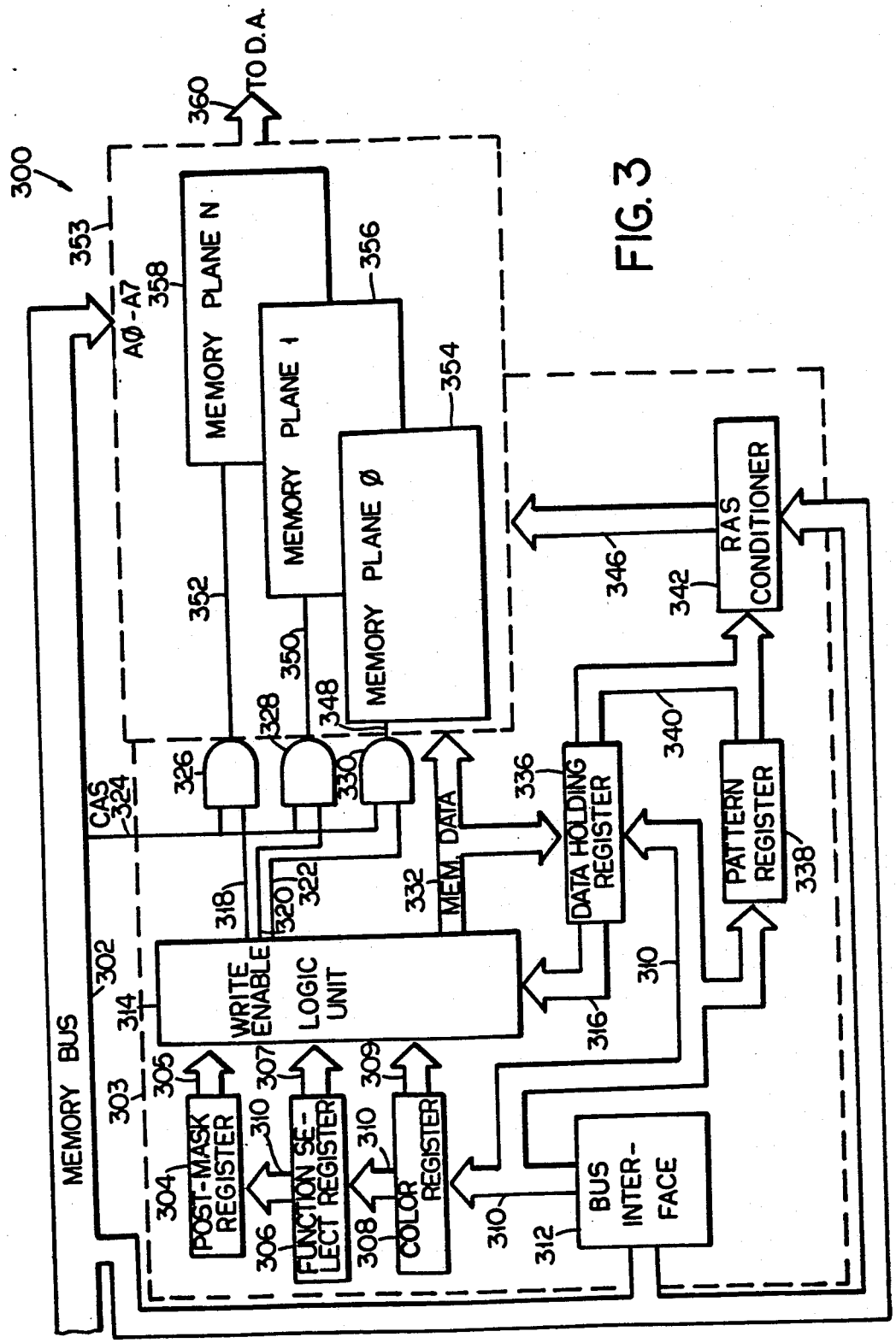
FIG. 3 is a block diagram of a pixel processor in accordance with the present invention.

Referring to FIG. 3, a frame buffer which utilizes the present invention is generally shown as 300. The frame buffer comprises a pixel processor 303 and a three dimensional memory array 353. Pixel processor 303 is connected to memory bus 302 which is connected to the graphics processor shown in FIG. 1. Bus 302 includes memory address lines A0-A7, memory control lines such as CAS line 324 and those connected to RAS conditioner 342, and memory data lines such as those connected to bus interface 312. Memory bus 302 is connected to the post-mask register 304, the function select register 306 and the color register 308 via bus interface circuitry 312 and bus 310. The outputs of these registers are connected via buses 305, 307 and 309, respectively, to the logic unit 314. The logic unit 314 generates write enable signals on lines 318, 320 and 322 which are coupled respectively to AND gates 326, 328 and 330 in memory 353. A memory data bus 332 transfers data from the logic unit into the memory 353. Data from the memory can also be transferred via bus 332 to data holding register 336 which in turn is connected to the logic unit 314 via bus 316. Data holding register 336 is also coupled via bus 340 to a RAS conditioner circuit 342 and also to bus interface 312 via bus 310. Pattern register 338 is coupled via bus 340 to the RAS conditioner circuit 342 and via bus 310 to bus interface 312. Another input to RAS conditioner 342 is from the memory bus 302 and the output of the circuit is coupled via bus 346 to the memory 353.

The memory 353 is a three dimensional memory divided into a series of two dimensional memory planes. Each of the memory planes stores one bit of information for each of the pixels on the display. Each bit of information has an x (horizontal) coordinate and a y (vertical) coordinate which corresponds to the pixel on the display device. The "depth" of the memory, comprising planes 0, 1 . . . N comprises the c (color) axis of the memory. In a typical memory, N might equal 12 which allows for 12 bits per pixel to define the color and/or intensity of each pixel on the display. The memory chips that comprise the memory 353 use a multiplexed address scheme in which the 16 bit address is multiplexed onto eight wires. Typically, the row address is presented first followed by the column address. This allows the address to be multiplexed onto the chip on half the number of pins on the integrated circuit that would otherwise be required. The 8 bit address is presented to the memory 353 via memory bus 302 and applied to all planes 354, 356 and 358 of the memory simultaneously. A row address strobe (RAS) is presented to the memory on bus 346 which causes the memory chips to interpret the address bits A0 to A7 as row address bits. The purpose of utilizing a bus and the purpose for a RAS conditioner 342 will be explained below. When the bits provided on lines A0 through A7 represent the column address a column address strobe (CAS) signal is applied by bus 302 on line 324 to enable AND gates 326, 328 and 330 to simultaneously apply the CAS signal to each of the memory planes which are enabled by logic unit 314.

The write enable signals 318, 320 and 322 are utilized to write a bit per plane to produce a word of N bits which determines the color and/or intensity of that particular pixel. The data to be written into each memory plane is determined by the information stored in the color register 308 and the function to be performed which is stored in the function select register 306. In addition, a pattern can be stored in post-mask register 304 which can be used to write protect any of the planes in the memory 353. This is useful, for example, where it is necessary to produce a rapid succession of updated images to the display, such as when producing animation effects. In this case, the memory could be divided into two groups of memory planes with one group being updated while the other is being utilized to refresh the display. The pattern stored in the post-mask register 304 would write protect the memory planes which are being utilized to refresh the display while allowing the other half of the memory to be updated with the next image to be displayed. This, in effect, doubles the speed at which images can be presented thus greatly enhancing the ability to produce animation effects.

The RAS conditioner circuit 342 allows the graphic processor to modify pixels on a bit-by-bit basis or in a block-mode in which a multiple number of pixels are written to at once. This feature is particularly useful when filling in an area on the display screen. In addition, a pattern may be stored in pattern register 338 which is coupled to RAS conditioner 342 by bus 340. This allows the area to be filled with a pattern which is defined by the code stored in the pattern register. For example, a checkerboard pattern could be achieved by loading alternate 1's and 0's into the pattern register and then writing to all of the bits. In a typical system, the RAS conditioner can write to 12 bits at once thus increasing the speed of writing by a factor of 12. If all of 12 bits are written to in a memory having 12 planes, then 144 bits will be changed during each write cycle.

Figure 2:
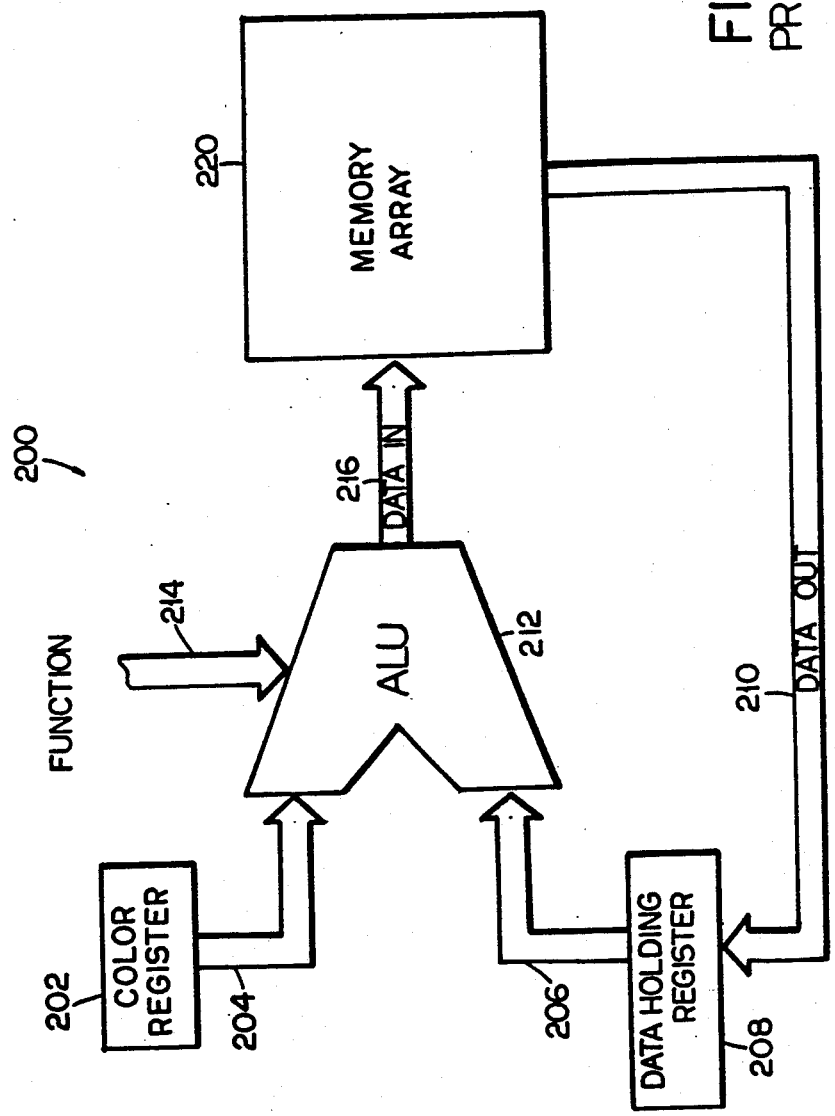
FIG. 2 is a block diagram of a prior art memory system employing a ALU pixel processor.

The pixel processor 303 can perform six operations on the data stored in memory 353. These functions are SET, CLEAR, WRITE, ZERO, EXCLUSIVE OR and COMPLEMENT. The WRITE and ZERO functions are used to draw and remove, respectively, graphics from the memory and require only memory write cycles. The WRITE cycle in which a pixel is just replaced, is the most straightforward way of accessing the memory. However, it is not always satisfactory. When drawing a line over another line, the color of the new line must be added to the information in memory rather than replacing it. This is called the SET function. When a line is to be cleared from memory, the CLEAR function is utilized. The SET function is performed by a Boolean OR and the CLEAR function performed by a Boolean AND function between the data stored in the color register and the data stored in the memory. In the prior art, these Boolean functions were treated as functions of two variables which required a read-modify-write cycle which took a relatively long time to implement. Applicant has discovered that these functions can be treated as functions of one variable, the data in the color register, so that the data in the memory can be modified utilizing only a write cycle. In a typical system discussed in connection with FIG. 2, a write cycle would take only 350 nanoseconds, thus increasing the speed at which these functions can be performed by a factor of two.

Table 1 shows a truth table for the SET function as practiced by the present invention. The Table lists the data in the color register 308, the data in the memory 353 for that pixel before the Boolean operation is performed (abbreviated "OLD MEM DATA") and the data which is in that memory location after the Boolean operation is performed (abbreviated "NEW MEM DATA"). The Boolean OR function is utilized to add the color data to the data in the memory. Thus, if the data in the color register is a zero, ORing the color data with the memory data will leave the data in the memory unchanged. If the data in the color register is a 1, then ORing the logical 1 with either a 0 or a 1 in the memory will yield a 1 to be inserted into the memory. Accordingly, it can be seen that the OR function can be provided without knowledge of the old memory data. Thus, the new memory data can be provided by a write function in which a 1 is written into the memory if there is a 1 in the color register and by inhibiting the write function to leave the memory unchanged if there is a zero in the color register. The use of the read-modify-write cycle required by the prior art is thus rendered superfluous.

TABLE 1

| OR (SET) Function Implementation | | |
|---|---|---|
| COLOR REGISTER | OLD MEM DATA | NEW MEM DATA |
| 0 | 0 | 0 |
| 0 | 1 | 1 |
| 1 | 0 | 1 |
| 1 | 1 | 1 |

Table 2 shows a truth table for the implementation of the AND function as practiced by the present invention. The Table lists the same data and uses the same abbreviations as Table 1. If the data in the color register is a 0, the output of an AND operation will always be a 0 regardless of the old memory data. Therefore, the AND operation can be performed by a write cycle which writes a zero into the memory location. Knowledge of the old memory data is not required. If the data in the color register is a 1, the results of the AND function will be controlled by the old memory data. Thus, if the old memory data is a 0, the output will also be a 0. If the old memory data is a 1 the output of the AND operation will also be a 1. Notice that for a 1 in the color register, this operation did not change the old memory data. Thus, if there is a 1 in the color register the AND operation may be performed by an inhibited write cycle in which the old memory data is unchanged. Again, the read-modify-write cycle utilized in the prior art is rendered superfluous.

TABLE 2

| AND Function Implementation | | |
|---|---|---|
| COLOR REGISTER | OLD MEM DATA | NEW MEM DATA |
| 0 | 0 | 0 |
| 0 | 1 | 0 |
| 1 | 0 | 0 |
| 1 | 1 | 1 |

As stated above, the SET function is used to add color to a pixel. Conversely, the CLEAR function is used to substract color from a pixel. For example, in a computer graphics system, if we were to draw a red line crossing a blue line, the SET function would add the red color to the blue color at the intersection of the lines. If we now want to remove the red line, the blue line should remain. Notice that, if we used the ZERO function, both lines would be removed (see Table 4).

The CLEAR function is implemented as a Boolean AND function with the color inverted. In order to avoid the necessity for the pixel processor inverting a color in order to clear the color from the memory, the CLEAR function is implemented by inverting the color register input before performing the Boolean AND function. A truth table for the CLEAR function is shown in Table 3. The Table lists the same data and uses the same abbreviations as Tables 1 and 2. In addition the Table lists the inverted color register data (abbreviated "color register") to make the comparison between Tables 2 and 3 easier. Notice that if we compare the color register, old mem data and new mem data columns of Table 3, it is identical to Table 2.

TABLE 3

| CLEAR Function Implementation | | | |
|---|---|---|---|
| COLOR REGISTER | COLOR REGISTER | OLD MEM DATA | NEW MEM DATA |
| 0 | 1 | 0 | 0 |
| 0 | 1 | 1 | 1 |
| 1 | 0 | 0 | 0 |
| 1 | 0 | 1 | 0 |

The Boolean AND and Boolean OR functions can be performed in the logic unit without the necessity of utilizing an ALU. Dedicated processing circuitry in the form of discrete logic gates, read only memories (ROMs), programmable logic arrays (PLA), or programmable arrays of logic (PAL) can be utilized. These devices and their implementation are well known to those skilled in the art and need not be described in detail here.

The implementation of the exclusive OR and COMPLEMENT functions requires the traditional read-modify-write cycle with the logic unit operating as a traditional ALU for those two functions. However, it is unnecessary to go to the expense of providing an ALU just to perform these two functions, as they can easily be performed by logic gates or one of the alternatives described above. The data is read back from the memory 353 on bus 332 into data holding register 336 which feeds the data over bus 316 into the "ALU" in the logic unit 314. After the "ALU" has performed the desired function, the data is output from the logic unit 314 on bus 332 and written back into the memory 353.

Table 4 shows the implementation of the six functions that are performed by the pixel processor. These functions are SET, CLEAR, WRITE, ZERO, EXOR (exclusive OR), and COMPL (complement). The Table also lists the data in that bit of the color register (COLORn), the data in that bit of the memory for that pixel (MEMDATn) and the data to be written into that bit of the memory (DATn). The notation "X" in the MEMDATn column stands for "don't care". It should be noted that for the SET and CLEAR functions, when a logic zero is shown for the data to be entered in the memory, a zero is not written into the memory but the contents of the memory left unchanged. This is clear from Table 5 which shows the generation of the write enable signals 318, 320 and 322 in accordance with the function being performed by the pixel processor. Table 5 lists the same functions as Table 4 except that the variables are COLORn and the mask register data (MASKn) and the result is the state of the write enable line to the memory. If the write enable line is deasserted, then no write cycle will occur and the memory will remain unchanged. Note from line 2 of the Table that when the color datais zero for the SET function the write enable is deasserted, thus producing no write cycle. Similarly, note from line 5 of the Table that when the color data is 0 for the CLEAR function, the write enable is also deasserted, thus producing no write cycle.

TABLE 4

| FUNCTION | COLORn | MEMDATn | → | DATn |
|---|---|---|---|---|
| SET | 0 | X | → | 0 |
| SET | 1 | X | → | 1 |
| CLEAR | 0 | X | → | 1 |
| CLEAR | 1 | X | → | 0 |
| WRITE | 0 | X | → | 0 |
| WRITE | 1 | X | → | 1 |

TABLE 4-continued

| FUNCTION | COLORn | MEMDATn | → | DATn |
|---|---|---|---|---|
| ZERO | X | X | → | 0 |
| EXOR | 0 | 0 | → | 0 |
| EXOR | 0 | 1 | → | 1 |
| EXOR | 1 | 0 | → | 1 |
| EXOR | 1 | 1 | → | 0 |
| COMPL | X | 0 | → | 1 |
| COMPL | X | 1 | → | 0 |

TABLE 5

| FUNCTION | COLOR, | MASKn | → | WRITE ENABLE |
|---|---|---|---|---|
| SET | 1 | 1 | → | ASSERTED |
| SET | 0 | X | → | DEASSERTED |
| SET | X | 0 | → | DEASSERTED |
| CLEAR | 1 | 1 | → | ASSERTED |
| CLEAR | 0 | X | → | DEASSERTED |
| CLEAR | X | 0 | → | DEASSERTED |
| WRITE | X | 1 | → | ASSERTED |
| WRITE | X | 0 | → | DEASSERTED |
| ZERO | X | 1 | → | ASSERTED |
| ZERO | X | 0 | → | DEASSERTED |
| EXOR | X | 1 | → | ASSERIED |
| EXOR | X | 0 | → | DEASSERTED |
| COMPL | X | 1 | → | ASSERTED |
| COMPL | X | 0 | → | DEASSERED |

As previously stated, the RAS conditioner allows up to 12 pixels horizonatally to be addressed at once so that 144 memory locations can be addressed, assuming that there are 12 memory planes in the system. This process speeds up area-fill by a factor of 12 over conventional single-pixel systems. The arrangement of pixels in the block could be organized in a square block as opposed to a horizontal line. This allows the pixels to be laid out in an arbitrary orientation before block transfer into memory. For example, in a 16 pixel block, the optimum arrangement is a 4 by 4 square matrix. The graphics processor would then use the block transfer to draw a line in almost any orientation. For example, a grid of pixels laid out as follows:

| 0 | 1 | 2 | 3 |
|---|---|---|---|
| 4 | 5 | 6 | 7 |
| 8 | 9 | 10 | 11 |
| 12 | 13 | 14 | 15 | which corresponds to a pattern of register bits 0 to 15 would permit the drawing of a vertical line by setting bits 0, 4, 8 and 12 of the pattern register and initiating a block transfer. A horizontal line would be drawn by setting bits 8, 9, 10 and 11, for example, and a 45° line from left to right would set bits 0, 5, 10 and 15. This technique would allow lines of almost any orientation to be drawn almost four times faster than a single pixel access. In addition, area-fill speed would be improved by a factor of almost 16 over a single pixel access. The reason that a factor of 16 improvement is not produced, is that border non-alignment causes a slight degradation in the speed improvement. Using the write-only functions for SET and CLEAR, the most common functions used for drawing in computer graphics, allows the block of pixels to be modified without any conventional read-back circuitry. The size of the pixel block is limited by the write ports into the memory. The 16 pixel block described above would be useful with the 64K by 4 dynamic video RAMs that are in common use today. Further information on the use of the block pixel technique can be found in the article "The 8 by 8 Display" in the ACM Transactions on Graphics, Vol. 2, No. 1, January 1983, pages 32-56, which is incorporated herein by reference.

Another feature is the ability to draw a figure in one plane of the memory 353 and then copy this into the appropriate ones of other planes. A technique in which half of the memory 353 was used for drawing an updated version of what is to be displayed and the other half used to provide a display is described above. In this technique, only one plane is used to provide a working plane and the others are either disabled or utilized to produce a current display. The RAS conditioner circuit described herein allows twelve bits in the horizontal direction to be read out from the working plane memory simultaneously. This permits such operations as exclusive OR and complement, which require the data to be read back, to be performed twelve times faster. Once the drawing is completed in the working plane, it is copied using the block transfer described above onto the appropriate ones of the other planes in order to provide an updated image.

While a particular embodiment of the present invention has been disclosed herein, certain changes and modifications will readily occur to those skilled in the art. Also changes and modifications can be made without departing from the invention as defined by the appended claims.

I claim:

1. A method of performing a Boolean OR operation on a function of two independent variables, one of said variables being stored in a first digital storage device which will also contain the result of said Boolean OR operation, the other of said variables being stored in a second digital storage device, the method comprising:
    writing a digital "1" into said first digital storage device when the contents of said second digital storage device is a digital "1" without reading the contents of said first digital storage device; and
    inhibiting a write cycle of said first digital storage device when the contents of said second digital storage device is a digital "0".

2. A method of performing a Boolean AND operation on a function of two independent variables, one of said variables being stored in a first digital storage device which will also contain the result of said Boolean AND operation, the other of said variables being stored in a second digital storage device, the method comprising:
    writing a digital "0" into said first digital storage device when the contents of said second digital storage device is a digital "0" without reading the contents of said first digital storage device; and
    inhibiting a write cycle of said first digital storage device when the contents of said second digital storage device is a digital "1".

3. Apparatus for performing a Boolean OR operation on a function of two independent variables, one of said variables being stored in a first digital storage device which will also contain the result of said Boolean OR operation, the other of said variables being stored in a second digital storage device, the apparatus comprising:
    means for writing a digital "1" into said first digital storage device when the contents of said second digital storage device is a digital "1" without reading the contents of said first digital storage device; and inhibiting a write cycle of said first digital storage device when the contents of said second digital storage device is a digital "0".

4. The apparatus of claim 3 wherein said first digital storage device is a multidimensional array of memory cells.

5. The apparatus of claim 4 wherein said second digital storage device is a register.

6. The apparatus of claim 4 wherein said multidimensional array of memory cells is a frame buffer for refreshing a display of a computer graphics system and said writing means is a pixel processor for modifying data in said frame buffer to change an image on said display.

7. Apparatus for performing a Boolean AND operation on a function of two independent variables, one of said variables being stored in a first digital storage device which will also contain the result of said Boolean AND operation, the other of said variables being stored in a second digital storage device, the apparatus comprising:

means for writing a digital "0" into said first digital storage device when the contents of said second digital storage device is a digital "0" without reading the contents of said first digital storage device; and inhibiting a write cycle of said first digital storage device when the contents of said second digital storage device is a digital "1".

8. The apparatus of claim 7 wherein said first digital storage device is a multidimensional array of memory cells.

9. The apparatus of claim 8 wherein said second digital storage device is a register.

10. The apparatus of claim 9 wherein said multidimensional array of memory cells is a frame buffer for refreshing a display of a computer graphics system and said writing means is a pixel processor for modifying data in said frame buffer to change an image on said display.

11. A computer graphics system comprising computer means for generating data representative of images to be displayed; a frame-buffer memory means coupled to said computer means for storing said data; a display coupled to said memory means and refreshed by th data stored therein; a data register means for storing information for modifying the data in said memory means; and a pixel processor coupled to said register means and to said memory means for modifying the data in said memory means by performing a Boolean OR operation with the data in said register means and said memory means, said pixel processor comprising means for writing a digital "1" into said memory means when the contents of said register means is a digital "1" without reading the contents of said memory means.

12. The system of claim 11 wherein said pixel processor includes means for inhibiting a write cycle of said memory means when the contents of said register means is a digital "0".

13. The system of claim 11 wherein said pixel processor includes means for modifying a plurality of pixels simultaneously.

14. A computer graphics system comprising computer means for generating data representative of images to be displayed; a frame-buffer memory means coupled to said computer means for storing said data; a display coupled to said memory means and refreshed by the data stored therein; a data register means for storing information for modifying the data in said memory means; and a pixel processor coupled to said register means and to said memory means modifying the data in said memory means by performing a Boolean AND operation with the data in said register means and said memory means, said pixel processor comprising means for writing a digital "0" into said memory means when the contents of said register means is a digital "0" without reading the contents of said memory means.

15. The system of claim 14 wherein said pixel processor includes means for inhibiting a write cycle of said memory means when the contents of said register means is a digital "1".

16. The system of claim 14 wherein said pixel processor includes means for modifying a plurality of pixels simultaneously.

* * * * *